Figure 1:
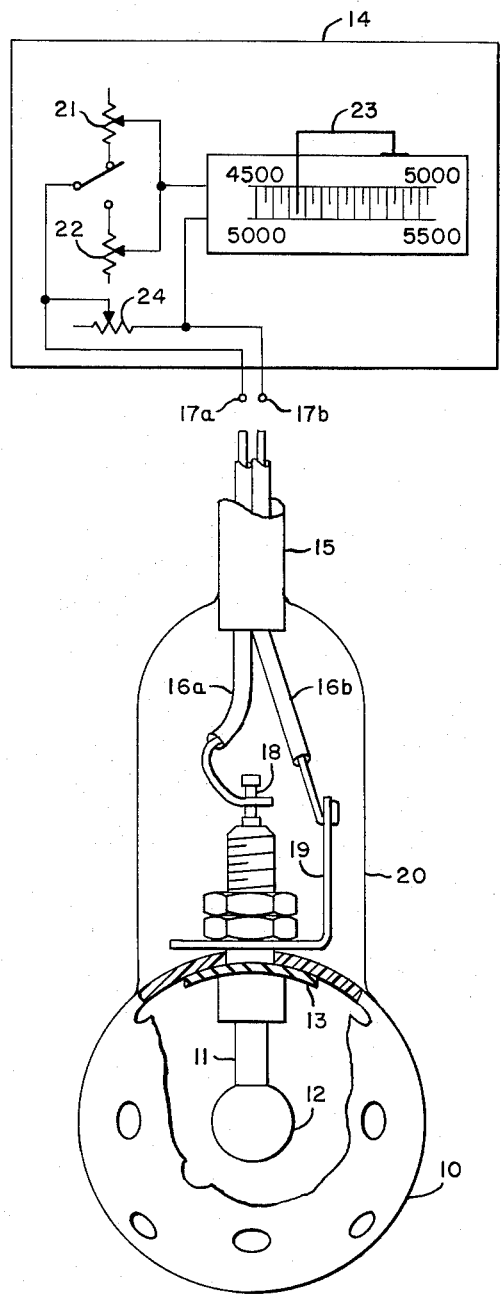

United States Patent Office 3,262,866
Patented July 26, 1966

3,262,866
METHOD AND APPARATUS FOR DETERMINING THE VELOCITY OF SOUND IN A LIQUID
Anthony C. Suleski, Centerport, N.Y., assignor to Hazeltine Research, Inc., a corporation of Illinois
Filed Feb. 6, 1963, Ser. No. 256,577
3 Claims. (Cl. 204—1)

GENERAL

The present invention relates to methods and apparatus for determining the velocity of sound in a liquid. Although the invention is particularly useful in determining the velocity of sound in sea water where such measurements are important for various naval operations and oceanographic surveys, it will be apparent that the invention may be employed to determine the velocity of sound in other liquids.

At the present time, the velocity of sound in a liquid is measured directly by apparatus employing acoustical techniques. One such technique involves the transmission of sound over a measured distance and the measurement of the time required for this sound to travel this distance. The velocity of the sound in the liquid is computed from the time and distance measurements. In another technique, a constant frequency sound is transmitted and the wavelength of the sound is measured. The velocity of the sound is computed from the equation $v = \lambda f$, where $\lambda$ is the wavelength and $f$ is the frequency.

A primary disadvantage of the presently used techniques is that they involve the use of relatively complex electronic and mechanical equipment thus making the equipment relatively expensive. As to the first technique described above, since the distance over which the sound is transmitted is usually in the order of a few inches or less while the velocity of sound in a liquid may be in the order of 4,000 feet per second, the mechanical positioning equipment must be capable of measuring the distance over which the sound is transmitted fairly accurately. Furthermore, the electronic equipment from which the sound is developed must be capable of supplying accurately time signals of precise dimensions so that the time measurements will be accurate. As to the second technique, the electronic equipment must be capable of controlling the frequency so that it is truly constant and must furthermore be able to accurately measure the wavelength of the sound. In addition, the transducers used in both techniques to convert the electrical signals into sound are relatively expensive.

A limitation of the presently used techniques is their inability to provide continuous analogue-type indications since each indication requires the transmission and reception of a sound.

It is therefore an object of the present invention to provide a new and improved apparatus for determining the velocity of sound in a liquid which is simple in construction and inexpensive to fabricate.

It is another object of the present invention to provide a new and improved method and apparatus for determining the velocity of sound in a liquid which provides continuous indications of this velocity.

In accordance with the present invention apparatus for determining the velocity of sound in a liquid comprises a galvanic cell having a spherical electrode surrounded by a concentric perforated electrode for developing a current between the electrodes whose magnitude is related to the physical characteristics of the liquid which affect the velocity of sound in the liquid, when the cell is immersed in the liquid and a current-measuring device responsive to the current and calibrated to indicate the velocity of sound in the liquid, when the galvanic cell is immersed in the liquid.

In accordance with the present invention the method of determining the velocity of sound in a liquid comprises placing a galvanic cell in the liquid with the liquid as an electrolyte, measuring the current produced by the cell and the step of converting the measured current, by correlating it with predetermined velocity data, into direct readings of the velocity of sound in the liquid.

For a better understanding of the present invention, together with other and further objects thereof, reference is had to the following description, taken in connection with the accompanying drawings, and its scope will be pointed out in the appended claims.

Figure 2:
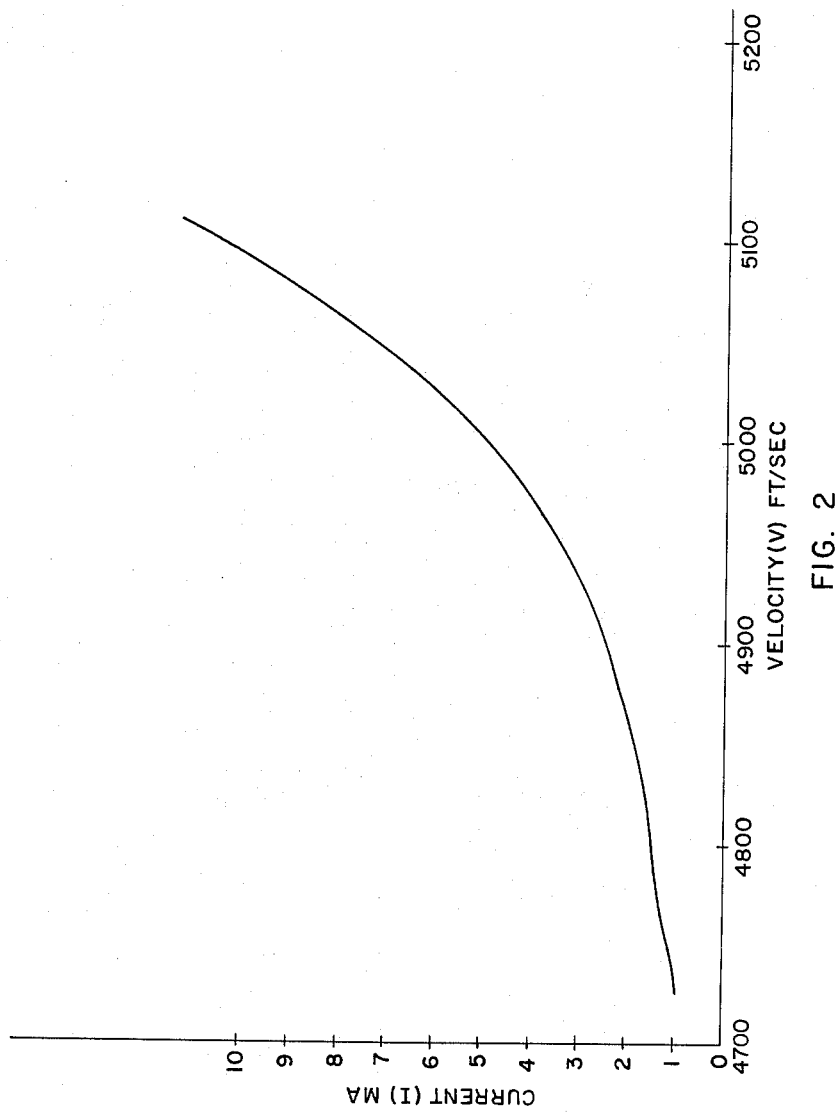

Referring to the drawings:

FIG. 1 shows apparatus for determining the velocity of sound in a liquid constructed in accordance with the present invention, and FIG. 2 is a graph depicting the relationship between the velocity of sound in a liquid and the galvanic corrosion current of a galvanic cell immersed in the same liquid.

DESCRIPTION AND OPERATION OF THE INVENTION

Whenever a metal is exposed to air or a liquid normal corrosion of the metal takes place. When such a metal is placed in electrical contact with another more noble metal, for example, when both metals are immersed in the same corroding solution called an electrolyte, an accelerated electro-chemical corrosion is produced on the less noble metal, that is, on that metal more conducive to corrosion. This accelerated corrosion results in a protection from corrosion for the more noble metal. Galvanic corrosion is generally understood to consist of the total corrosion of the less noble metal. Thus, galvanic corrosion of a metal comprises the normal corrosion of the metal due to exposure alone plus the additional corrosion due to its electrical contact with another and more noble metal.

During this accelerated corrosion process, an electric current is generated by the two metals and the magnitude of this current is related to the acceleration of the corrosion of the less noble metal beyond its normal corrosion rate. Actual corrosion cannot take place unless there is such a flow of electrical current. The magnitude of this current or the acceleration of corrosion is dependent upon basically two factors, the physical characteristics of the two metals and the physical characteristics of the electrolyte.

With respect to the physical characteristics of the two metals, two factors must be considered. First, the relative galvanic tendency between the two metals and second, the physical configuration of the two metals, namely their relative sizes and geometric shapes. Chemical tables are available which list various metals in a series which indicates their general tendencies to form galvanic cells. From these tables one can predict the relative tendencies between any two metals to produce galvanic corrosion.

With respect to the physical characteristics of the electrolyte, it has been found that the galvanic corrosion rate is dependent upon such factors as the concentration of salt (salinity) in the electrolyte, the temperature of the electrolyte and the pressure at any particular point in the electrolyte. Other factors also bear on the rate of galvanic corrosion but those specifically mentioned have been found to have the greatest influence.

The velocity of sound in a liquid, such as sea water, is known to be dependent upon such factors as the salinity of the liquid, the temperature of the liquid and the pressure at a particular point in the liquid. Since the velocity of sound in a liquid is effected by the same physical characteristics as is the galvanic corrosion rate, a galvanic cell and a properly calibrated current-measuring device may be used to determine the velocity of sound in a liquid in the locality at which the galvanic cell is immersed in the liquid.

Accordingly, apparatus for determining the velocity of sound in a liquid constructed in accordance with the present invention includes a galvanic cell immersed in the liquid for developing a current whose magnitude is related to the physical characteristics of the liquid which affect the velocity of sound in the liquid. One possible form of this galvanic cell is shown in FIG. 1 as consisting of a perforated plastic ball 10 which may be the familiar and commercially available practice golf ball, sometimes called a whiffle ball. This perforated plastic ball 10 is covered with a thin coating of silver paint over the inside and outside surfaces. It is then plated with copper, nickel and gold. This plated plastic ball acts as one electrode of the galvanic cell.

A plastic jack 11 is mounted in the ball 10 and a center zinc electrode 12 is forced into the jack 11. This zinc electrode acts as the second electrode of the galvanic cell. A rubber washer 13 seals the interface between the perforated ball 10 and the jack 11.

The apparatus for determining the velocity of sound in a liquid constructed in accordance with the present invention also includes a current-measuring device responsive to the current developed by the galvanic cell and calibrated to indicate the velocity of sound in the liquid in which the galvanic cell is immersed. This current-measuring device is represented by a meter 14 having a voltmeter movement. Although this current-measuring device may have either a voltmeter or an ammeter movement, it has been found that a voltage readout converted into a velocity of feet per second is more suitable from the electrical design standpoint.

A two-wire connection 15, composed of wires 16a and 16b, connects the galvanic cell to the voltmeter terminals 17a and 17b. Wire 16a is connected to the center terminal 18 of jack 11, and wire 16b is connected to a solder lug 19 which is soldered to the gold surface of the perforated ball 10. The top portion of the galvanic cell is encapsulated with an epoxy resin 20.

The operation of the apparatus is based on ordinary galvanic corrosion action. As the cell is immersed in the liquid, the liquid is free to flow through the holes in the perforated ball 10. The zinc electrode 12 being the less noble metal begins to corrode. This corrosion produces a current flow through wires 16a and 16b which current flow produces a velocity indication on the properly calibrated meter 14.

It should be noted that the present invention is not limited to the form of the galvanic cell shown in FIG. 1. Nor is the galvanic cell shown in FIG. 1 limited to the metals and metal coatings previously mentioned in connection with the description of the invention. The specific configuration previously described is merely one form of a galvanic cell which has been constructed and found to yield very favorable results. It has been found that the use of two concentric spheres, namely perforated ball 10 and zinc electrode 12, optimizes the flow of current and results in uniform current density and corrosion of the zinc electrode 12. Any other geometric configuration which provides such results may be used. Furthermore, the plastic ball 10 may be replaced by a specially made metallic perforated ball. A plastic ball has been used simply because it is commercially available in the proper form. As to the choice of gold and zinc to form the two electrodes, this choice was made from the chemical tables previously mentioned which indicate that gold and zinc have a strong tendency to produce galvanic corrosion of the zinc.

Reference is made to FIG. 2 in connection with the explanation of how meter 14 may be calibrated to provide velocity indications. The graph shown in FIG. 2 is one of a number of graphs derived experimentally and is representative of the relationship between the velocity of sound in a given liquid and the galvanic corrosion current of a galvanic cell immersed in this liquid. Specifically, the graph was derived by immersing a presently available velocity measuring device and a galvanic cell constructed in accordance with the present invention in the same liquid. As the physical characteristics of the liquid were changed, such as, for example changing temperature, readings were simultaneously taken from the conventional velocity measuring device and a voltmeter connected across the leads of the galvanic cell. FIG. 2 shows the results of these readings. The graph shows a definite linear relationship over a substantial range between the velocity of sound in a liquid and galvanic corrosion current developed by a galvanic cell immersed in the same liquid.

Two techniques may be used in the actual calibration of the apparatus constructed in accordance with the present invention. In the first, the entire apparatus comprising the combination of the galvanic cell and the current-measuring device may be calibrated as a pair. The galvanic cell and a conventional velocity measuring device are both immersed in the same liquid and subjected to the same conditions. The physical characteristics of the liquid are varied so as to develop different velocities of sound in the liquid. The scale of the current-measuring device would be established by simply assigning appropriate velocity values to the different deflections developed by the meter due to the changes in the physical characteristics of the liquid. Assuming that the relationship is linear over a substantial portion of the range, it is obvious that only two different velocity measurements are necessary to establish the scale of the meter.

Reference is made to the meter portion of the apparatus shown in FIG. 1 in connection with the explanation of the second technique of calibration. In this technique, only the galvanic cell is initially calibrated to determine the shape of the graph representative of the relationship between galvanic corrosion current and the velocity of sound. The scale of any current-measuring device to be used with this galvanic cell, would then be made to correspond to the shape of the graph. When the galvanic cell is paired with a current-measuring device, the cell would be immersed in a liquid in which the velocity of sound is known or may be determined by any presently available device. Then by adjustment of either resistor 21 or resistor 22, dependent upon which scale is being used, the indicator 23 is moved to that position on the scale corresponding to the known velocity. Variable resistor 24 is also included in the meter 14 to compensate for any variations in external resistance such as may be present in different connection wires running between the galvanic cell and the meter.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:
1. Apparatus for determining the velocity of sound in a liquid comprising:
  a galvanic cell having a spherical electrode surrounded by a concentric perforated electrode for developing a current between said electrodes whose magnitude is related to the physical characteristics of said liquid which affect the velocity of sound in said liquid, when said cell is immersed in said liquid;
  and a current-measuring device responsive to said current and calibrated to indicate the velocity of sound in said liquid, when said galvanic cell is immersed in said liquid.

2. The method of determining the velocity of sound in a liquid comprising:
   placing a galvanic cell in said liquid with the liquid as an electrolyte;
   measuring the current produced by said cell;
   and the step of converting the measured current, by correlating it with predetermined velocity data, into direct readings of the velocity of sound in said liquid.

3. The method of determining the velocity of sound in sea water comprising:
   producing a galvanic current by the interaction of said sea water with a gold electrode and a zinc electrode;
   measuring the magnitude of the galvanic current so produced;
   and the step of converting the measured current produced by gold and zinc electrodes immersed in sea water, by correlating it with predetermined velocity data, into direct readings of the velocity of sound in said sea water.

References Cited by the Examiner

UNITED STATES PATENTS

| | | | |
|---|---|---|---|
| 1,332,483 | 3/1920 | Bridge | 136—90 |
| 1,601,383 | 9/1926 | Todd | 204—195 |
| 1,668,434 | 5/1928 | Todd | 204—195 |
| 1,889,889 | 12/1932 | Ennis | 204—195 |
| 1,944,803 | 1/1934 | Ornstein | 204—195 |
| 2,069,562 | 2/1937 | Schnorf | 204—195 |
| 2,564,495 | 8/1951 | Mullen | 136—90 |
| 2,721,342 | 10/1955 | Pickren | 136—90 |
| 2,870,067 | 1/1959 | Baker et al. | 204—195 |
| 2,939,827 | 6/1960 | Jacobson et al. | 204—195 |
| 2,939,900 | 6/1960 | Jones et al. | 136—91 |
| 2,992,170 | 7/1961 | Robinson | 204—195 |

JOHN H. MACK, *Primary Examiner.*

MURRAY TILLMAN, ALLEN B. CURTIS, *Examiners.*

T. TUNG, *Assistant Examiner.*